(12) United States Patent
Xiao et al.

(10) Patent No.: US 11,058,994 B2
(45) Date of Patent: Jul. 13, 2021

(54) TRITIUM CLEANUP SYSTEM AND METHOD

(71) Applicant: SAVANNAH RIVER NUCLEAR SOLUTIONS, LLC, Aiken, SC (US)

(72) Inventors: Xin Xiao, Augusta, GA (US); Lucas M. Angelette, Augusta, GA (US); Paul R. Beaumont, Aiken, SC (US); Henry T. Sessions, Aiken, SC (US); Heather Mentzer, Graniteville, SC (US); Jared L. Clark, Aiken, SC (US)

(73) Assignee: Savannah River National Solutions, LLC, Aiken, SC (US)

( * ) Notice: Subject to any disclaimer, the term of this patent is extended or adjusted under 35 U.S.C. 154(b) by 0 days.

(21) Appl. No.: 16/251,456

(22) Filed: Jan. 18, 2019

(65) Prior Publication Data

US 2020/0230553 A1 Jul. 23, 2020

(51) Int. Cl.
*B01D 59/26* (2006.01)
*B01D 53/86* (2006.01)
*B01D 53/96* (2006.01)

(52) U.S. Cl.
CPC ......... *B01D 59/26* (2013.01); *B01D 53/8668* (2013.01); *B01D 53/8671* (2013.01); *B01D 53/96* (2013.01); *B01D 2255/1021* (2013.01); *B01D 2255/1023* (2013.01); *B01D 2257/108* (2013.01); *B01D 2257/702* (2013.01)

(58) Field of Classification Search
CPC ..... B01D 59/26; B01D 53/8868; B01D 53/96
USPC ........................................................ 423/580
See application file for complete search history.

(56) References Cited

U.S. PATENT DOCUMENTS

| 3,698,156 A | 10/1972 | Dirian |
| 3,888,974 A | 6/1975 | Stevens |
| 4,190,515 A | 2/1980 | Butler et al. |
| 4,259,209 A | 3/1981 | Nakane et al. |

(Continued)

FOREIGN PATENT DOCUMENTS

| CA | 1137025 | 12/1982 |
| CN | 203672869 U * | 6/2014 |

(Continued)

OTHER PUBLICATIONS

Andreev, et al. "Theory of Isotope Separation in Counter-Current Columns: Review" *Separation of Isotopes of Biogenic Elements in Two-phase Systems* Chapter 1, pp. 1-40. (Abstract only).

(Continued)

*Primary Examiner* — Melissa S Swain
(74) *Attorney, Agent, or Firm* — Dority & Manning, PA

(57) ABSTRACT

Work area cleanup systems and methods are described for removing tritium from the atmosphere of a work area such as inert gas gloveboxes. Systems utilize a multi-column approach with parallel processing. Tritium of a tritium-contaminated stream is converted into tritiated water and adsorbed onto the separation phase of a first column as a second, parallel column can be simultaneously regenerated. The gaseous stream that exits the column during the regeneration phase can carry a high tritium concentration. The system can also include and a separation stage during which the tritium of the gaseous regeneration stream can be separated from the remainder of the regeneration product.

20 Claims, 2 Drawing Sheets

(56) References Cited

U.S. PATENT DOCUMENTS

| | | | |
|---|---|---|---|
| 4,276,060 | A | 6/1981 | Aldridge |
| 4,376,066 | A | 3/1983 | Bruggeman et al. |
| 4,411,755 | A | 10/1983 | Herman et al. |
| 4,533,539 | A | 8/1985 | Iniotakis et al. |
| 4,589,891 | A | 5/1986 | Iniotakis et al. |
| 4,755,471 | A | 7/1988 | Saito et al. |
| 4,875,945 | A | 10/1989 | Penzhorn et al. |
| 5,154,878 | A | 10/1992 | Busigin et al. |
| 5,319,955 | A | 6/1994 | Chastagner |
| 5,445,803 | A | 8/1995 | Dworschak et al. |
| 6,165,438 | A | 12/2000 | Willms et al. |
| 6,632,367 | B1 | 10/2003 | Furlong et al. |
| 7,470,350 | B2 | 12/2008 | Bonnett et al. |
| 7,815,890 | B2 | 10/2010 | Busigin |
| 8,470,073 | B2 | 6/2013 | Heung et al. |
| 9,682,860 | B2 | 6/2017 | Maroun et al. |
| 2005/0263453 | A1 | 12/2005 | Collias et al. |
| 2007/0246344 | A1 | 10/2007 | Bonnett et al. |
| 2010/0021372 | A1 | 1/2010 | Bonnett et al. |
| 2011/0243834 | A1 | 10/2011 | Denton |
| 2012/0060688 | A1* | 3/2012 | Heung ............ B01D 59/26 95/115 |
| 2013/0108517 | A1 | 5/2013 | Tosti et al. |
| 2013/0115156 | A1 | 5/2013 | Ghirelli et al. |
| 2014/0356270 | A1 | 12/2014 | Shmayda et al. |
| 2015/0053373 | A1 | 2/2015 | Heung et al. |
| 2016/0284433 | A1* | 9/2016 | Xiao ............ C01B 4/00 |
| 2016/0310898 | A1 | 10/2016 | Denton et al. |
| 2017/0036193 | A1 | 2/2017 | Xiao et al. |
| 2018/0056240 | A1 | 3/2018 | Xiao et al. |

FOREIGN PATENT DOCUMENTS

| | | | |
|---|---|---|---|
| CN | 105513661 | A * | 4/2016 |
| CN | 106018003 | A * | 10/2016 |
| DE | 3122498 | | 6/1982 |
| EP | 0198940 | | 10/1986 |
| EP | 0698893 | | 2/1996 |
| GB | 2039866 | | 8/1988 |
| JP | 52145697 | A * | 12/1977 |
| JP | 53093294 | | 8/1978 |
| JP | 53110800 | | 9/1978 |
| JP | 62254100 | A * | 4/1989 |
| JP | 63241395 | A * | 3/1990 |
| JP | 11137969 | | 5/1999 |
| JP | 2003-071251 | | 3/2003 |
| JP | 2007-155355 | | 6/2007 |
| WO | WO 90/10935 | | 9/1990 |
| WO | WO 2006/045886 | | 5/2006 |
| WO | WO 2006/112746 | | 10/2006 |
| WO | WO 2016/035737 | | 3/2016 |

OTHER PUBLICATIONS

Demange, et al. "Zeolite membranes and palladium membrane reactor for tritium extraction from the breeder blankets of ITER and DEMO" *Fusion Engineering and Design* 88 (2013) pp. 2396-2399.

Iwai, et al. "Experimental evaluation of tritium oxidation efficiency in the room temperature recombiner" *Fusion Engineering and Design* (2018). (Article in Press).

Michling, et al. "Capture and Isotopic Exchange Method for Water and Hydrogen Isotopes on Zeolite Catalysts up to Technical Scale for Pre-Study of Processing Highly Tritiated Water" *Fusion Science and Technology* 67(3) (2015) pp. 483-486. (Abstract only).

Shmayda, et al. "The Laboratory for Laser Energetics' Hydrogen Isotope Separation System" *Fusion Engineering and Design* 109-111 (2016) pp. 128-134.

Shu, et al. "Highly Tritiated Water Processing by Isotopic Exchange" *Fusion Science and Technology* 67(3) (2015) pp. 563-566. (Abstract only).

Butler, et al. "Novel Catalysts for Isotopic Exchange Between Hydrogen and Liquid Water" *Am. Chem. Soc.* (1978) pp. 93-109.

Ducret, et al. "Hydrogen isotopes separation by thermal cycling absorption process" *Fusion Eng. Des.* 58-59 (2001) pp. 417-421.

Iwai, et al. "Influence of Framework Silica-to-Alumina Ratio on the Tritiated Water Adsorption and Desorption Characteristics of NaX and NaY Zeolites" *J. Nucl. Sci. Techn.* 45 (2008) pp. 532-540.

Lee, M.W. "Thermal Cycling Absorption Process—A New Way to Separate Hydrogen Isotopes" *Westinghouse Savannah River Co.* WSRC-MS-2000-00061 (2000) pp. 197-200.

Lin, K.H. "Tritium Enrichment by Isotope Separation Technique" *Oak Ridge Natl. Lab.* ORNL-TM-3976 (1972).

Qian, et al. "Comparation of Two Separation Materials Used in Thermal Cycling Absorption Process" *J. Nucl. Radiochem.* 34 (2012) pp. 174-178. (Non-translated / Abstract only).

Park, et al. "Hydrophobic Polydimethylsiloxane (PDMS) Coating of Mesoporous Silica and Its Use as a Preconcentrating Agent of Gas Analytes" *Languir* 30 (2014) pp. 10256-10262.

Reyes, et al. "LIFE Tritium Processing: A Sustainable Solution for Closing the Fusion Fuel Cycle". *Lawrence Livermore Natl. Lab.* LLNL-TR-576952 (2012) pp. 1-9.

Shimizu, et al. "Numerical study on extraction of tritium generated in HMR by way of system composed of EXEL-process and thermal diffusion column cascade" *Nukleonika* 47(Supp. 1) (2002) pp. S89-S93.

Wu, et al. "Experimental study on hydrogen isotope separation using twin-bed periodically countercurrent flow technique" *Fusion Sci. Techn.* 61 (2012) pp. 81-85.

* cited by examiner

TRITIUM CLEANUP SYSTEM AND METHOD

STATEMENT AS TO RIGHTS TO INVENTIONS MADE UNDER FEDERALLY SPONSORED RESEARCH

This invention was made with Government support under Contract No. DE-AC09-08SR22470 awarded by the United States Department of Energy. The Government has certain rights in the invention.

BACKGROUND

In much nuclear- and plasma-based research and work, gaseous tritium ($T_2$) is produced. For instance, tritium can be produced in nuclear power generation as a by-product of the fission of uranium-235, plutonium-239, and uranium-233 as well as by neutron activation of lithium-6. In heavy water moderated and cooled reactors tritium can be produced when a deuterium nucleus captures a neutron. Tritium is a low energy beta emitter, and while it is not dangerous externally, it is a radiation hazard upon inhalation, ingestion or absorption. Moreover, tritium readily binds hydroxyl radicals to form tritiated water. Thus, steps must be taken to remove tritium in any relevant work or study area.

Tritium facilities utilize gloveboxes as secondary confinement for tritium processes, which allows any tritium released from primary confinement to be processed for cleanup via the glovebox cleanup system. FIG. 1 illustrates a typical prior art cleanup system for gloveboxes or other relatively small work areas. As shown, the system draws tritium-containing air out of the area proper by means of a blower 10. The system utilizes a hot oxidation catalyst bed 12 to oxidize trace amounts of tritium and tritiated hydrocarbons into tritiated water, which is subsequently removed by a series of ambient temperature zeolite beds (Z-bed) 14. A moisture saturated Z-bed product is then baked out 16, and moisture is reduced by hot magnesium metal-containing bed (Mg bed) 18 to yield gaseous hydrogen isotopes that can be collected, e.g., at a tank 20, for downstream recovery 22 of the tritium.

Unfortunately, due to moisture permeation into gloveboxes and other work areas, the majority of magnesium metal in prior art systems is consumed by light water since the concentration of tritiated water is typically very low. The operation also involves costly Mg bed replacement and treatment of radioactive solid waste (spent magnesium oxide). The glovebox oxidation catalyst bed 12 and accompanying preheater 11 and cooler 13, Mg bed 18, and Z-Bed bake out operation 16 add undesirable heat loads to the work area environment, as the work area (e.g., the glovebox) and cleanup system is a closed system for radiological confinement. This aspect is particularly problematic for glovebox cleanup systems, as the heat capacity of the small glovebox atmosphere is limited.

What are needed in the art are cleanup systems for relatively small areas, e.g., a workroom or a glovebox, that can remove tritium from the area atmosphere at lower cost and lower heat loads that previously known systems.

SUMMARY

Aspects and advantages of the invention will be set forth in part in the following description, or may be obvious from the description, or may be learned through practice of the invention.

According to one embodiment, disclosed is a work area cleanup system (e.g., a glovebox cleanup system) that includes a first adsorption column and a second adsorption column. The first adsorption column contains a separation phase that has an isotopic separation factor of about 1.06 or greater between tritiated water and water (i.e., in a water isotope separation). The first adsorption column also contains a catalyst that catalyzes an isotopic exchange between tritiated water in the separation phase and gas phase protium or deuterium (i.e., catalytic isotope exchange). The second adsorption column also contains a separation phase that can be the same or different from the separation phase of the first column and a catalyst that can be the same or different from the catalyst of the first column. As such, the separation phase of the second column can have an isotopic separation factor of about 1.06 or greater between tritiated water and water and the catalyst of the second column can catalyze an isotopic exchange between tritiated water in the separation phase and gas phase protium or deuterium. The catalyst of the first column and the catalyst of the second column can also catalyze an oxidation reaction of gas phase protium, deuterium, tritium or tritiated hydrocarbons with air or oxygen to form water with respective isotopes (i.e., an oxidation catalyst). Thus, the column packing material in both the first column and the second column can have all 3 functions: water isotope separation, catalytic isotope exchange, and oxidation catalyst.

The first and second adsorption columns can be configured for gas/vapor communication with the interior volume of a work area and can also be configured for parallel and optionally counter-current flow through the columns, e.g., the columns are configured such that a first gas can pass through the first column in a first direction concurrently with the passage of a second gas through the second column in the opposite direction.

Also disclosed are methods for tritium removal from the interior volume of a work area. A method can include directing a gas/vapor stream from the work area volume through a first adsorption column. As this flow passes through the first adsorption column, tritium gas and tritiated hydrocarbons can be oxidized to form tritiated water. Tritiated water carried in the flow (both tritiated water formed by oxidation in the column and tritiated water vapor carried into the column from the work area) can be adsorbed by the separation phase. Alternatively, tritium of the tritiated water in the flow can exchange with protium or deuterium of the separation phase of the column. Simultaneously, as the work area is vented through the first adsorption column and tritiated water is captured in the first adsorption column, a gaseous flow comprising protium and/or deuterium can be caused to flow through a second, parallel adsorption column as a regeneration flow. As this regeneration flow passes through the second column, tritium previously captured on the separation phase of the second column (e.g., tritiated water) can exchange with protium or deuterium of the gaseous regeneration flow, resulting in HT or DT gas in the regeneration flow and removal of tritium from the column separation phase (i.e., column regeneration). Following exit of the regeneration flow from the second adsorption column, the content of the regeneration flow can be further processed to separate the tritium carried by the regeneration flow.

A method can also include reversing the flows through the columns such that the first column is regenerated while the second column is utilized to capture tritium from a gas/vapor flow that is vented from the work area interior.

BRIEF DESCRIPTION OF THE FIGURES

A full and enabling disclosure of the present invention, including the best mode thereof, directed to one of ordinary

DETAILED DESCRIPTION

Figure 1:
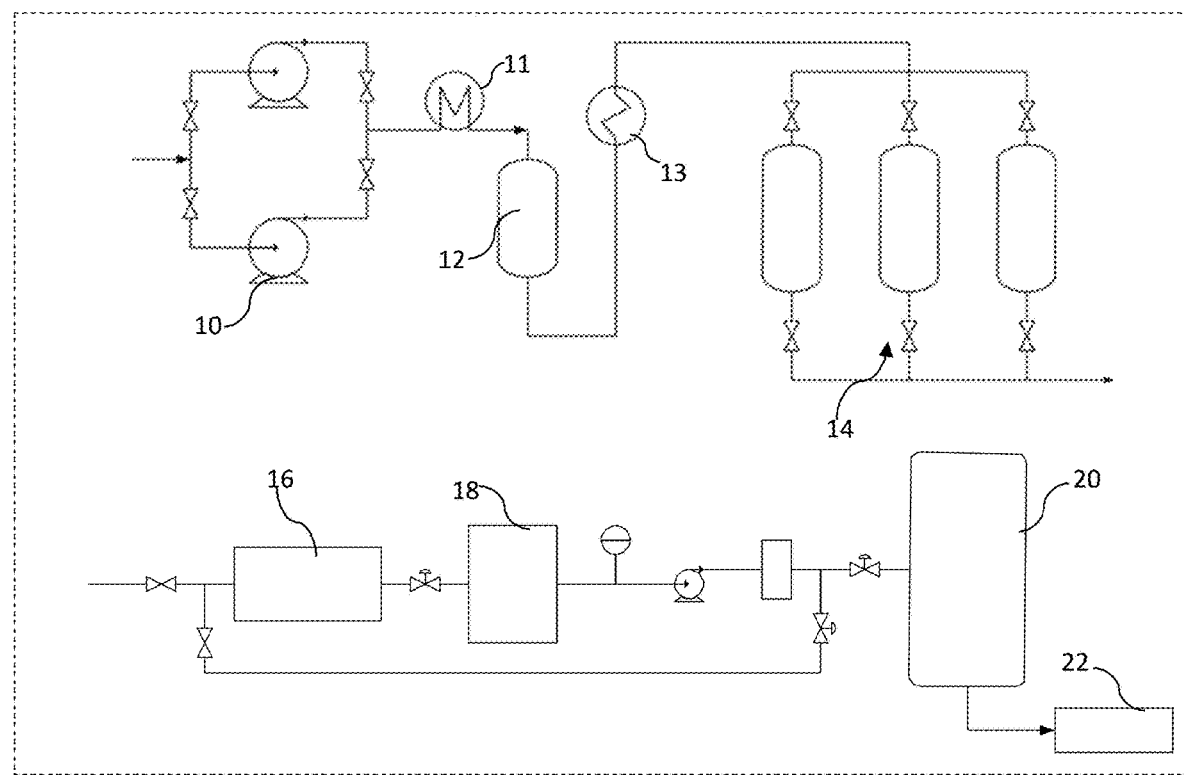
FIG. 1 illustrates a prior art glovebox cleanup system.

It is to be understood by one of ordinary skill in the art that the present discussion is a description of exemplary embodiments only, and is not intended as limiting the broader aspects of the present disclosure. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, disclosed herein are work area cleanup systems and methods for removing tritium from the internal volume of a work area by use of the systems. The methods and systems can be utilized for cleaning the exhaust air from work areas such as workshops as well as for closed systems such as inert gas gloveboxes.

Much of the following discussion concerns utilization of the systems and methods with regard to glovebox clean up. However, it should be understood that while the disclosed cleanup systems and methods are particularly useful for closed, small work areas such as gloveboxes having a relatively small interior volume, e.g., about 1000 liters or less, the systems and methods are in no way intended to be limited to only glovebox clean up systems. In particular, the disclosed cleanup systems and methods can also be beneficially utilized in cleanup of tritium from larger work areas, such as workshops, storage areas, or the like.

Disclosed methods and systems utilize a multi-column approach that can utilize parallel processing. According to the methods, during an initial capture stage, tritium of a tritium-contaminated stream can be adsorbed onto a separation phase as a gas/vapor flow pulled out of the interior volume of a work area is passed through a first adsorption column containing the separation phase. Meanwhile, a second, parallel adsorption column can be simultaneously regenerated. During the regeneration stage of a column, previously adsorbed tritiated water can be picked up by a gaseous regeneration stream and/or tritium adsorbed on the separation phase can be exchanged with hydrogen (protium and/or deuterium) in the gaseous regeneration stream that is passed through the second column. In general, a regeneration stream can be passed through a column in a counter-current direction as compared to the flow direction through the column during the capture stage, however, this is not a requirement of disclosed systems and methods. The gaseous stream that exits the column during the regeneration stage can carry a high tritium concentration. The system can also include and a separation stage during which the tritium of the gaseous regeneration stream can be separated from the remainder of the regeneration stream effluent.

Beneficially, the process can be simplified as compared to previous cleanup systems, while also providing a more efficient process. For instance, the adsorption columns of a system can operate at ambient temperature, and can potentially replace the functionality of multiple processes of previously known systems such as those illustrated in FIG. 1. For example, the oxidation catalyst bed 12 and accompanying preheater 11 and cooler 13, multiple ambient temperature zeolite beds 14, zeolite bed bake out operation 16 and magnesium bed 18 can all be eliminated and replaced with the adsorption columns of the disclosed systems.

Disclosed systems can clean up one or more of tritium, tritiated water, and tritiated hydrocarbons from work area atmospheres and can be adapted within the existing footprint of currently existing systems as well as suitable for new system design. The separation systems can operate at ambient temperature, which can eliminate heat loads emitted by components of previously known systems. Additionally, as disclosed systems do not require a Mg bed for moisture removal, the costly replacement associated therewith, and post-process Mg bed waste for radioactive materials can be eliminated. As a nearly passive process, the disclosed system can be beneficially utilized for emergency tritium removal with or without the need of column regeneration.

Figure 2:
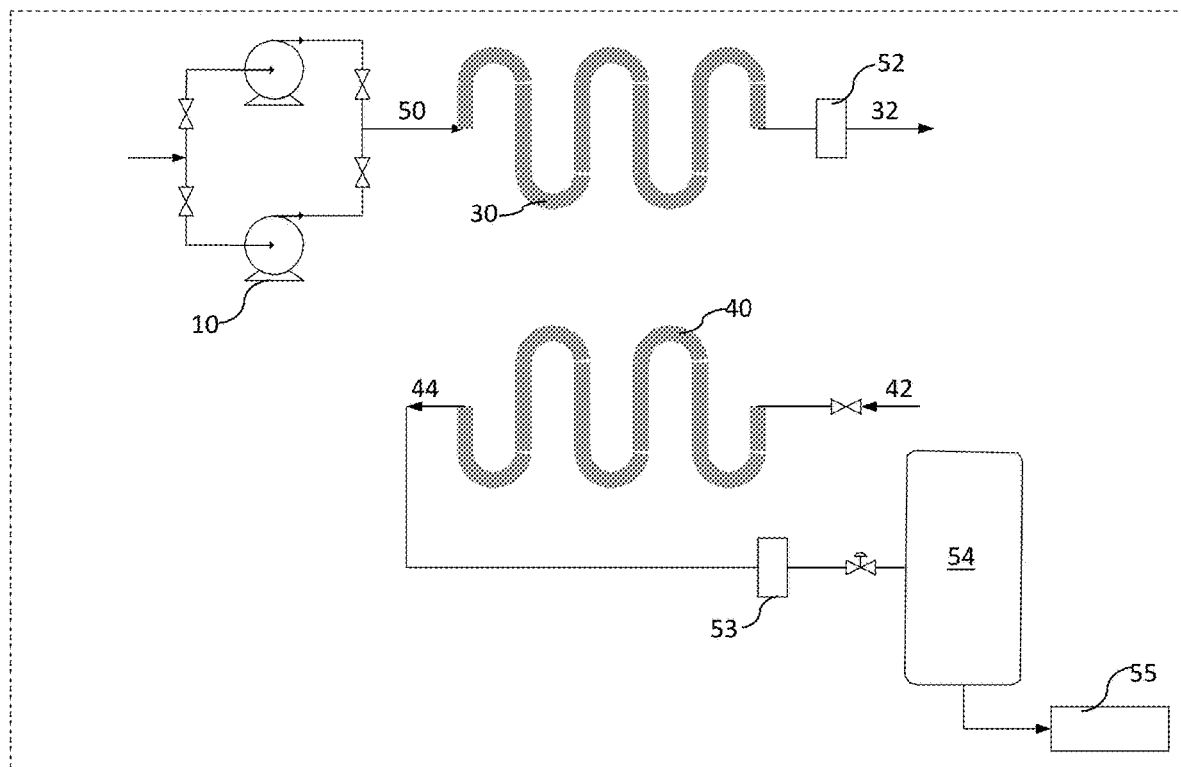
FIG. 2 illustrates one embodiment of a glovebox cleanup system as disclosed herein.

FIG. 2 illustrates one embodiment of a cleanup system. As illustrated, the cleanup system can incorporate one or more blowers 10 that can draw a volume content of a work area (e.g., a glovebox) into one or the other of a first adsorption column 30 and a second adsorption column 40. As the stream 50 proceeds through one of the adsorption columns, e.g., through the first adsorption column 30 as illustrated in FIG. 2, tritium gas or tritiated hydrocarbons carried in the flow can be oxidized to form tritiated water. Generally, the oxidation can be carried out in the inlet portion of the column with air or oxygen and catalyzed by a column catalyst. It should be noted, however, that the process can be utilized in conjunction with air glovebox as well as inert glovebox ($N_2$, Ar, He, etc.) with air permeation or a small amount of air or oxygen injection for the oxidation process.

Tritiated water that is formed by the oxidation reaction as well as any tritiated water carried as vapor in the flow from the work area can be adsorbed onto the separation phase of the first adsorption column 30 and leave purified water that can flow out 32 of the first column 30. Simultaneously, a regeneration flow 42 containing gaseous protium and/or deuterium can flow through the second adsorption column 40 to regenerate the second column 40. During regeneration, previously adsorbed tritium can exchange for protium or deuterium of the regeneration flow 42 and/or tritiated water can be picked up by the passing regeneration flow 42 to produce tritium-enriched effluent 44. After a period of adsorption in the first column 30 and regeneration in the second column 40, the function of column 30 and column 40 can swap, similar to a swing reactor.

The process and system can be very energy efficient and can easily be scaled to continuously or semi-continuously clean the atmosphere of a work area of any desired size. Through modification of the number of columns, number and size of blowers, etc., a system can be individualized to high volume or low volume throughput. As such, disclosed systems provide a route to specifically design a system for work areas of any size. Moreover, the throughput of an existing system can be easily increased through the addition of one or more additional sets of adsorption columns 30, 40 to an existing system, without the necessity of otherwise altering the existing system.

Referring to FIG. 2, the adsorption columns 30, 40 are in gas communication with a work area such that a gas stream 50 carrying content from the atmosphere of the work area (not illustrated in FIG. 2) can be delivered into one or the other of the adsorption columns 30, 40. In the illustrated embodiment the gas stream 50 is being delivered to the first adsorption column 30. The gas stream 50 fed sequentially to the adsorption columns 30, 40 can include tritium and other non-tritiated components in any form including gas, vapor, liquid, or a mixture thereof. For instance, a contaminated gas stream 50 can include one or more of tritiated gas ($T_2$, HT, DT), tritiated moisture ($T_2O$, HTO, DTO), or a vapor or gaseous tritiated hydrocarbon in a gaseous or gas/vapor flow.

The system and method can effectively treat high volumes of contaminated gas/vapor having low concentration of tritium contaminant. For instance, the contaminated stream 50 delivered from the work area to an adsorption column 30 of the system can include tritium at a concentration on the order of parts per billion or parts per trillion. By way of example, the system can treat a contaminated stream 50 including a tritium contaminant at a concentration of about 1 part per billion (ppb) or less, about 500 parts per trillion (ppt) or less, or about 100 ppt or less. In one embodiment, the contaminated stream 50 can include tritium in a concentration of about 20 ppt or less.

The adsorption columns 30, 40 can each carry a separation phase that can preferentially adsorb tritiated water and/or exchange tritium of tritiated water for protium or deuterium of the separation phase as the stream 50 passes through one or the other of the adsorption columns 30, 40 in a capture stage. During the exchange, tritiated water and/or tritium of the tritiated water can be loaded on the separation phase.

In one embodiment, the columns 30, 40 can carry the same separation phase as one another. However, this is not a requirement, and in other embodiments, the columns 30, 40 can carry different separation phase materials. While the separation phase is not particularly limited, in one embodiment the separation phase of each column 30, 40 can have an isotopic separation factor for tritium of tritiated water of about 1.06 or greater, for instance about 1.1 or greater, or about 1.2 or greater, in one embodiment.

As utilized herein the term 'isotopic separation factor' $\alpha$, is defined as follows:

$$\alpha=[C'/(1-C')]/[C''/(1-C'')],$$

where C' and (1−C') are the relative concentrations of $Q_2O$ and QTO, respectively (Q being either protium or deuterium), in the mixture at the outlet of a finite separation stage in the adsorption column, and C" and (1−C") are the corresponding quantities in the starting mixture at the inlet of the separation stage in the adsorption column. An adsorption column can have multiple individual separation stages or equivalent (e.g., tens, hundreds or even thousands of individual finite separation stages).

The separation phase contained within an adsorption column 30, 40 can be any suitable high surface area material. For instance, the separation phase can be either organic or inorganic and can be a solid or a gel. By way of example, the separation phase can include porous particles have an average diameter in the millimeter range (e.g., about 5 millimeters or less) and can have a large surface area, e.g., about 100 square meters per gram ($m^2/g$) or greater, about 200 $m^2/g$ or greater, or about 300 $m^2/g$ or greater. In those embodiments in which the separation phase includes porous materials, the average pore diameter can generally be on the order of about 500 Angstroms (Å) or less, for instance about 300 Å or less, or about 200 Å or less, in one embodiment.

Specific materials as may be utilized as the separation phase materials can include, without limitation, polymeric materials (e.g., polystyrene/divinylbenzene, polyacrylic/divinylbenzene), aluminas, silicas, aluminum silicates (e.g., clays, zeolites), silica gels, and so forth. By way of example, zeolites (also commonly referred to as molecular sieves) as may be utilized can include low silica (aluminum rich) zeolites A and X (e.g., type 3A, type 4A, type 5A, type 13X) that have a surface that is highly selective for tritiated water.

The separation phase can include one or more functional groups and/or associated molecules that can encourage exchange of tritium of tritiated water and/or adsorption of tritiated water at the surface of the separation phase. For example, the separation phase can include hydroxyl groups at the surface of the material, which can encourage the isotopic exchange of tritium of tritiated water with the protium of the hydroxyl groups.

In one embodiment, the separation phase can be hydrated, and can include water molecules that can be exchanged with tritiated water molecules as a stream 50 passes through a column 30, 40. Such materials have been described, e.g., in Journal of Nuclear Science and Technology, 45(6), 532, 2008, and in U.S. Patent Application Publication No. 2016/0284433 to Xiao, which is incorporated herein by reference. According to this embodiment, the separation phase can include polymeric materials, crystalline oxides, metal ions or other ions that can have associated therewith water molecules of hydration. For instance, the separation phase can include polystyrene/divinylbenzene, polyacrylic/divinylbenzene, alumina, silica, sodium aluminosilicate, zeolites, a cationic portion that can be associated with one or more water molecules. Cationic portions can include, without limitation, ammonium cations or metal cations such as aluminum, magnesium, copper, zinc, cobalt or chromium.

A column 30, 40 can also incorporate one or more catalyst elements from Group VIII of the periodic table that can catalyze the oxidation of tritium-containing materials to form tritiated water, as well as to catalyze isotope exchange between the tritiated water and hydrogen gas. Suitable catalysts can include, without limitation, Fe, Co, Ni, Ru, Rh, Pd, Os, Ir, Pt. For instance, in one embodiment, the separation phase of a column 30, 40 can include platinum or palladium modified zeolite. The catalyst can encourage oxidation of tritium-contamination components of the stream such as tritium-contaminated hydrogen gas ($T_2$, HT, DT) as well as tritium-contaminated hydrocarbons to form tritiated water. The resulting tritium-contaminated water can subsequently be adsorbed by the separation phase of the column (e.g., the zeolite) or the tritium of the tritium-contaminated water can be subsequently exchanged with hydrogen of the separation phase of the column. Beneficially, the catalytic oxidation of tritium-contaminated components of the stream 50 can be carried out at ambient temperature, which can decrease the energy consumption of the cleanup process as compared to previously known heated oxidation catalyst beds.

As a stream 50 passes through an adsorption column 30, tritium of the input stream 50 can be adsorbed on to the surface of the separation phase and clean, decontaminated water can exit the column at 32. For instance, the water stream that exits the bottom of the enrichment column can have a radioactivity level from tritiated water of about 60,000 Becquerel per milliliter (Bq/mL) or less, about 30,000 Bq/mL or less, about 10,000 Bq/mL or less, about 1000 Bq/mL or less, about 100 Bq/mL or less, or about 60 Bq/m L or less.

Figure 3:
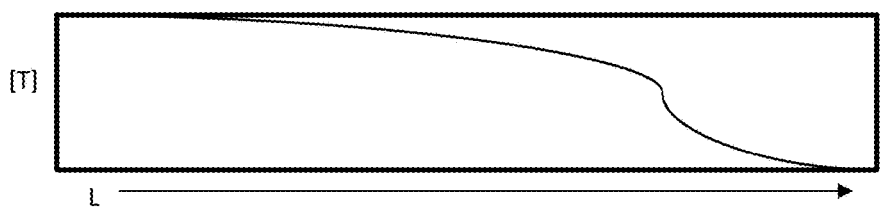
FIG. 3 illustrates a tritium concentration profile across an adsorption column upon tritium stripping of a glovebox content by the adsorption column.

The adsorbed tritium of the adsorption column 30 can describe a concentration profile as the tritium is trapped in the column 30. A typical concentration profile for tritium across an adsorption column is illustrated in FIG. 3, which illustrates the decreasing concentration of tritium [T] across the length L from the inlet to the exit of the adsorption column during the capture stage of the process. The stream 50 can continue to flow through the adsorption column 30 during a capture stage of the process until the column effluent reaches radioactive breakthrough, e.g., radioactivity due to tritium reaches about 60 Bq/mL.

To determine radioactive breakthrough, a system can optionally incorporate a radiation detector 52 in communication with the flow 32 exiting the adsorption column 30. Radiation detectors 52 that can be placed in communication with the effluent of the adsorption columns 30, 40 are not particularly limited, and the disclosed systems can beneficially incorporate any detector that can detect tritium (i.e., beta particles) in a flow. By way of example, and without limitation, radiation detectors encompassed herein can include ionization detectors (ion chambers, proportional counters, Geiger counters), scintillation detectors incorporating organic scintillators, inorganic scintillators, or combinations thereof, as well as β-induced x-ray spectrometry (BIXS) detectors. In addition, a single radiation detector 52 can be in communication with one or more adsorption columns 30, 40. For instance, the effluent 32 from the first adsorption column 30 can flow through the radiation detector 52 for a first capture stage and subsequently, the effluent from the second adsorption column 40 during a second capture stage can likewise flow through the same radiation detector 52. Alternatively, each adsorption column can be associated with a unique radiation detector for the capture stage of that column.

Upon or prior to radioactive breakthrough in the effluent 32 of the first adsorption column 30, the stream 50 can be rerouted to flow through the second adsorption column 40. The now tritium saturated first adsorption column 30 can then be subjected to a regeneration stage. The second adsorption column 40, which is now undergoing a capture stage as described above has been previously regenerated during the capture stage of the first adsorption column 30 during which it was being utilized to capture tritium from the stream 50.

A regeneration stage of the process can include flowing a hydrogen-containing gaseous regeneration stream 42 through the adsorption column 30, 40 (illustrated in FIG. 2 as flowing through adsorption column 40). The hydrogen gas of the regeneration stream 42 can include protium, deuterium, or a mixture thereof in the form of $H_2$, $D_2$, and/or HD. In general, the regeneration stream 42 can flow through the adsorption column 30, 40 in the direction countercurrent to the previous stream 50 of the capture stage. However, this is not a requirement of a system, and in some embodiments, the regeneration stream 42 of the regeneration stage can flow through the column in the same direction as the stream 50 of the capture stage.

During the regeneration stage of a column 30, 40, the gaseous regeneration stream 42 can pick up the tritiated water of the separation phase and/or an isotopic exchange can be carried out between the hydrogen of the regeneration stream 42 and captured tritium of the separation phase.

In some embodiments, a regeneration catalyst can be included in the adsorption column 30, 40 to encourage the exchange of protium/deuterium for tritium. The regeneration catalyst can be a component of the previously described separation phase or can be a separate material that is incorporated within the adsorption column 30, 40 in conjunction with the separation phase, as desired. The regeneration catalyst can be the same or can differ from an oxidation catalyst as previously described. For instance, in one embodiment, the same catalyst can be utilized to catalyze the oxidation of tritium-contaminated materials to form tritiated water during a capture stage and also to encourage the exchange of gas phase protium for the captured tritium of the solid phase during the regeneration stage. In addition, the regeneration catalyst of the first adsorption column 30 can be the same as the regeneration catalyst of the second adsorption column 40, or can differ.

In one embodiment, a platinum or palladium catalyst can be loaded onto the separation phase and can be utilized as an oxidation catalyst in the capture stage during which the catalyst can catalyze oxidation of tritium-contaminated components vented from the work area to form tritiated water. During the regeneration phase, the same material can be utilized as the regeneration catalyst and can catalyze exchange of tritium previously adsorbed to the separation phase with protium of the gaseous flow through the enrichment column 40. Of course, the catalysts are not limited to platinum or palladium catalysts, and other materials for use as an oxidation and/or a regeneration catalyst can include, without limitation, elements of Group VIII of the periodic table (Fe, Co, Ni, Ru, Rh, Os, Ir).

The flow rate of the gaseous flow through an adsorption column 40 during the regeneration stage can vary. For example, in one embodiment, at a flow rate of about 52 liters per minute, a gaseous flow 42 through an adsorption column 40 can pick up about 100 parts per million (ppm) tritium.

Following the exchange of protium (or deuterium) for tritium on the separation phase and capture of tritiated water of tritiated water by the regeneration stream 42, the column 40 can be regenerated for a repeat of the capture stage of the process with a new flow of contaminated stream 50 through the adsorption column 40. As the second adsorption column 40 was being regenerated, the first adsorption column 30 was capturing tritium from a contaminated stream 50. Upon redirection of the flows 50, 42, the first adsorption column 30 can be regenerated in a regeneration stage while the second column 40 goes through a capture stage. Thus, the system can provide a self-recharging cleanup system, which can decrease down time of a system and provided additional cost savings and other added benefits.

Beneficially, because of the working principle of water molecular isotope exchange and catalytic isotope exchange of the disclosed systems, the adsorption columns 30, 40, can remain relatively humid and do not remove moisture or humidity from the stream 50 that is pulled off of the work area. As such, the environment of the work area can remain relatively unaffected by the cleanup system. This can be particularly beneficial when utilizing the systems in a closed glovebox cleanup application, as the glovebox environment ($N_2$ or Ar) can exhibit a lower humidity difference from the surrounding room air as compared to prior art systems. In particular, moisture permeation into the glovebox due to a moisture concentration gradient can be greatly reduced by use of disclosed systems.

Further, as the adsorption columns 30, 40 can separate non-radiological light water from tritiated water during the capture stage, only a small amount of tritiated water carried in the gaseous effluent stream 44 developed during a regeneration stage will need to be processed. This provides for much lower water processing requirements as compared to prior art systems.

The gaseous effluent 44 from the regeneration stage can include tritium in a relatively high concentration, for instance about 5 ppm or greater, about 10 ppm or greater, or about 100 ppm or greater. The gaseous flow 44 that exits one of the adsorption columns 30, 40 during the regeneration stage can be further processed for recovery of tritium from the gas. For instance, the gaseous effluent flow 44 can be examined by use of a radiation detector 53 and can be immediately processed for tritium recovery or can be stored in a storage tank 54 prior to processing.

In one embodiment, the recovered tritium-containing gas carried in the gaseous effluent 44 can be further processed for recovery of tritium according to a thermal cycling adsorption process (TCAP) 55 as is known in the art. One embodiment of a TCAP that may be utilized has been described in U.S. Pat. No. 8,470,073 to Heung, et al., which is incorporated herein by reference. Briefly, a TCAP process can incorporate a palladium column and an inverse column that can be to separate hydrogen isotopes into a tritium stream and a protium stream.

An inverse column can include an adsorbent that preferentially adsorbs the heavier hydrogen isotope. That is, the adsorbent of the column adsorbs tritium better than deuterium, and deuterium better than protium. During use, the column can be heated and cooled to cycle the temperature between a low temperature and a high temperature. The specific temperatures of the cycle can vary depending upon the specific adsorbent used. For instance, in one embodiment, the column can be cycled between about 90° C. and about 180° C. At the lower temperature the inverse column can adsorb hydrogen (and preferentially the heavier isotope(s) of hydrogen) and at the higher temperature the adsorbed hydrogen can be released. The amount of the heavy hydrogen isotope that is adsorbed by the column can vary depending upon flow rate and pressure of the gas.

Adsorbents for use in the inverse column can include, without limitation, a molecular sieve, activated carbon, alumina, silica, silica-alumina, clays, or mixtures of materials. Molecular sieves as may be utilized can include, for example, type 3A, type 4A, type 5A, type X, type Y, ZSM-5, Mordenite, type L, Omega, or other types having 3-10 Angstrom pore diameters that preferentially adsorb the heavier hydrogen isotopes. Transition metals such as vanadium and chromium and their alloys that can preferentially absorb hydrogen isotopes and have isotopic effect similar to the molecular sieves can also be used.

During use, the inverse column is alternatively heated and cooled. During the cool cycle, the tritium of the enriched gaseous flow is preferentially adsorbed by the inverse column, and an output line can contain primarily the lighter isotope (protium). During the hot cycle, the adsorbed material is release, and the output line can contain primarily the heavier isotope (tritium).

The adsorbent, e.g., palladium, can be supported on an inert support material, such as diatomaceous earth (also known as kieselguhr), which does not directly adsorb or separate hydrogen isotopes but can function as support for the adsorbent (e.g., palladium) to increase reaction kinetics and reduce pressure drop as the gas flows through the columns.

When utilizing a palladium adsorbent, the TCAP columns can be cycled from a low temperature of about 90° C. to a high temperature of about 180° C. At the lower temperature, hydrogen is adsorbed onto the adsorbent, with preference for protium adsorption, and at the higher temperature, the adsorbed materials are released from the adsorbent.

A cleanup system as described herein can separate and recover about 95% or greater, about 97% or greater or about 99% or greater of the tritium contained in a work area environment. As such, disclosed systems and methods can be useful in a wide variety of applications including, without limitation, tritium research facilities, laser fusion research facilities, accelerator fusion facilities, dense plasma fusion facilities, neutron generator, etc.

Tritium that is separated and recovered according to the disclosed methods and system can be suitable for any use as is known in the art. For instance, the recovered tritium can be utilized in self-powered lighting applications as a replacement for radium, as a fuel for controlled nuclear fusion reactions, or as a chemical tracer, for instance as a radiolabel or as a tracer in ocean circulation and ventilation.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A work area cleanup system comprising:
   a blower configured for communicating gas and/or vapor of an atmosphere from a work area;
   a first adsorption column, the first adsorption column containing a first separation phase having an isotopic separation factor of about 1.06 or greater between vapor phase tritiated moisture and vapor phase non-tritiated moisture, the first adsorption column further containing a first catalyst that catalyzes isotopic exchange between tritium of vapor phase tritiated moisture of the first separation phase and gas phase protium or deuterium;
   a second adsorption column, the second adsorption column containing a second separation phase having an isotopic separation factor of about 1.06 or greater between vapor phase tritiated moisture and vapor phase non-tritiated moisture, the second adsorption column further containing a second catalyst that catalyzes isotopic exchange between tritium of vapor phase tritiated moisture of the second separation phase and gas phase protium or deuterium;
   wherein the first and second adsorption columns are configured for alternate communication with the blower such that only one of the first and second adsorption columns receive a gas and/or vapor flow from the work area at one time and wherein the first and second adsorption columns are configured for parallel flow with respect to one another.

2. The system of claim 1, the first catalyst and/or the second catalyst also catalyzing an oxidation reaction of a tritium-containing compound with oxygen or air to form vapor phase tritiated moisture.

3. The system of claim 1, further comprising a flow control system configured such that while the first adsorption column is used to capture tritium from the work area, the second adsorption column is being regenerated via catalytic isotope exchange, the flow control system being configured for modification of gas and/or vapor flows through the system such that following a period of time, the second adsorption column is used to capture tritium from the work area and the first adsorption column is regenerated via catalytic isotope exchange.

4. The system of claim 1, wherein the first and second adsorption columns are configured for counter-current parallel flow with respect to one another.

5. The system of claim 1, wherein the work area comprises the interior of a glove box.

6. The system of claim 1, wherein the system is an emergency tritium capture device.

7. The system of claim 1, wherein the first adsorption column and the second adsorption column are in communication with one or more radiation detectors.

8. The system of claim 1, further comprising a tritium recovery system in communication with the first adsorption column and the second adsorption column.

9. The system of claim 1, the first separation phase and the second separation phase being independently selected from a polymeric material, an alumina, a silica, and aluminosilicate, or a zeolite.

10. The system of claim 1, the first catalyst and the second catalyst each comprising one or more Group VIII elements in the periodic table.

11. The system of claim 10, the first catalyst and/or the second catalyst comprising platinum or palladium.

12. A method for removal of tritium from the interior volume of a work area by use of the system of claim 1, the method comprising:

by use of the blower directing a stream comprising a gas and/or a vapor and comprising a tritiated compound from the work area volume through the first adsorption column, the first catalyst catalyzing conversion of the tritiated compound to form vapor phase tritiated moisture, the vapor phase tritiated moisture being separated from vapor phase non-tritiated moisture in the first separation phase;

directing a regeneration flow comprising hydrogen and/or deuterium through the second adsorption column, tritium of the separated vapor phase tritiated moisture held in the second separation phase being isotopically exchanged with protium or deuterium of the regeneration flow as the regeneration flow passes through the second adsorption column; and after a period of time, altering the flows through the first adsorption column and the second adsorption column such that the stream from the work area volume is directed through the second adsorption column and the regeneration flow is directed through the first adsorption column.

13. The method of claim 12, wherein the stream is directed from the work area volume through the first adsorption column simultaneously with the directing of the regeneration flow through the second adsorption column.

14. The method of claim 13, wherein the stream is directed from the work area through the first adsorption column in a counter-current flow direction as compared to the regeneration flow through the second adsorption column.

15. The method of claim 12, further comprising injecting air or oxygen into the stream from the work area to facilitate the conversion of the tritiated compound to form the vapor phase tritiated moisture.

16. The method of claim 12, wherein the tritiated compound comprises, $T_2$, HT, DT, $T_2O$, HTO, DTO, or a tritiated hydrocarbon.

17. The method of claim 12, wherein the work area volume comprises a volume within a glovebox.

18. The method of claim 12, further comprising separating the exchanged tritium from the regeneration flow downstream of the second adsorption column.

19. The method of claim 12, the first separation phase and the second separation phase being independently selected from a polymeric material, an alumina, a silica, an aluminosilicate, or a zeolite.

20. The system of claim 12, the first catalyst and the second catalyst being independently selected from platinum and palladium.

* * * * *

UNITED STATES PATENT AND TRADEMARK OFFICE
CERTIFICATE OF CORRECTION

PATENT NO. : 11,058,994 B2  
APPLICATION NO. : 16/251456  
DATED : July 13, 2021  
INVENTOR(S) : Xin Xiao et al.

Page 1 of 1

It is certified that error appears in the above-identified patent and that said Letters Patent is hereby corrected as shown below:

On the Title Page

Under (73) Assignee: "Savannah River National Solutions, LLC" should read "Savannah River Nuclear Solutions, LLC"

Signed and Sealed this  
Twenty-ninth Day of March, 2022

Drew Hirshfeld  
*Performing the Functions and Duties of the*  
*Under Secretary of Commerce for Intellectual Property and*  
*Director of the United States Patent and Trademark Office*